Aug. 7, 1934.　　　G. M. BELLANCA　　　1,969,200
WING STRUCTURE
Filed Sept. 4, 1931
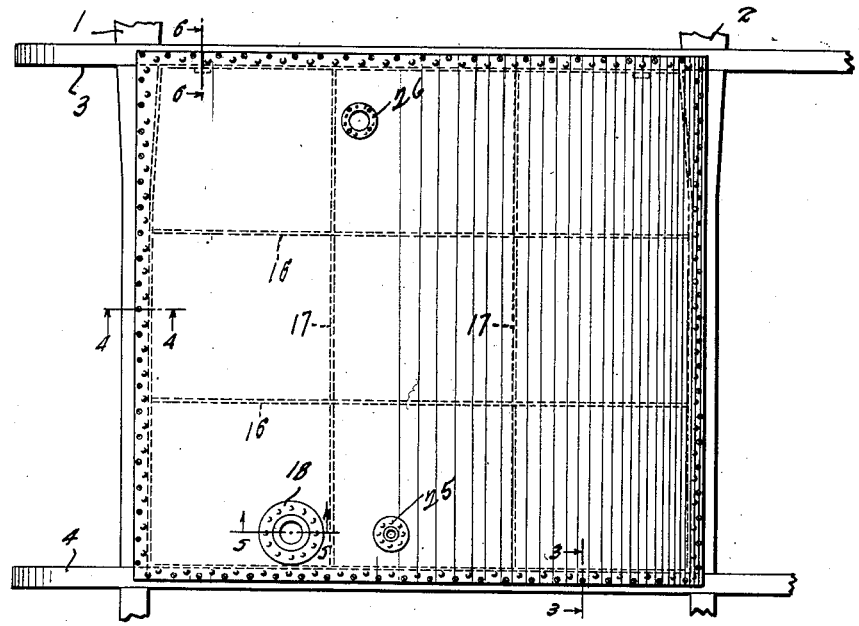
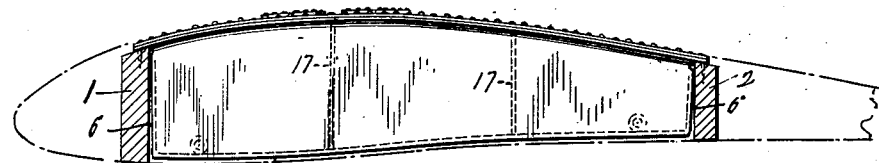
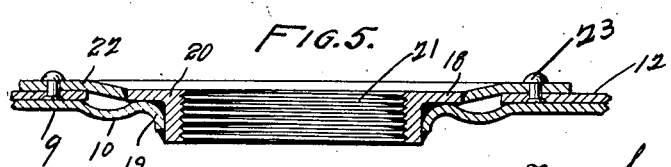
Inventor
GIUSEPPE M. BELLANCA
By Semmes & Semmes
Attorneys Patented Aug. 7, 1934

1,969,200

UNITED STATES PATENT OFFICE 1,969,200

WING STRUCTURE

Giuseppe M. Bellanca, New Castle, Del.

Application September 4, 1931, Serial No. 561,285

5 Claims. (Cl. 244—31)

This invention relates to airplane structures and more particularly to a fuel tank for aircraft.

In recent years a number of attempts have been made to improve fuel tank constructions and particularly the gasoline tanks forming a part of the wing structure.

In the early days of the airplane industry these gasoline tanks were made of a light-gauge tinned copper or brass. It was recognized at that time that this material was rather heavy for airplane construction yet it was employed because of the ease with which the material could be soldered or otherwise serviced.

Since that time improvements have been made in gasoline tank constructions, one of the most important and most widely used consisting essentially of a nickel plated duralumin tank. This material is very satisfactory inasmuch as it combines the advantage of high strength with light weight. It is nevertheless open to some objections, and particularly to the objection of great expense because not only is the duralumin rather expensive but the process of plating nickel on duralumin is rather difficult.

An object of the present invention is to provide a novel type of airplane fuel tank.

Another object of the invention is to provide a gasoline tank for airplanes of the built-in structure which combines the advantages of a light weight with high strength.

A further object is to provide a gasoline tank of a composite structure involving in the construction a duralumin contour and rigidifying plate and an aluminum container.

With these and other equally important objects in view the invention comprehends the concept of constructing a gasoline container, preferably to be built into a wing, which comprises essentially aluminum or other similar light weight non-ferrous metal with which is associated a light weight non-ferrous metal of greater tensile strength, such as duralumin, and so positioning the two metals as to utilize the high strength metal as a protective cover and a contour member for the wing.

In order to more readily explain the invention an illustrative physical embodiment is shown in the accompanying drawing, of which:

Fig. 1 is a plan view of the gasoline tank with its associated wing structure.

Fig. 2 is a cross sectional elevation of the structure shown in Fig. 1.

Fig. 3 is an enlarged detail taken on line 3—3 of Fig. 1.

Fig. 4 is a view similar to Fig. 3 taken on line 4—4 of Fig. 1.

Figs. 5 and 6 are enlarged details of inlets and outlets taken on line 5—5 and 6—6 respectively of Fig. 1.

In accordance with the present invention one method of manufacturing improved gasoline tanks comprises utilizing aluminum or similar light weight metal for the main container and then associating with this an upper surface or template which at once performs the double function of generally rigidifying and strengthening the gasoline tank and also of establishing the wing contour. Preferably also such a structure may be installed in airplanes to take the form as shown in the drawing. For example the gasoline tank may be mounted in a wing structure comprising the leading spar 1 and the trailing spar 2. With these spars are associated rib members 3 and 4 respectively. The spars and ribs may be of laminated wood structure or of metal as desired. As shown in Fig. 1 the tank is enclosed within the rectilinear section comprehended by adjacent spars and ribs so that these latter members at once define the confines of the tank and serve as supports for it.

As shown in Figs. 2, 3 and 4, the tank comprises a bottom portion 5 which may be of any desired contour to conform to the shape of the adjacent skin of the wing. This bottom portion 5 preferably is integrally formed with the side walls 6 which extend upwardly and in their terminations are bent inwardly as at 7 and outwardly into a substantially horizontal extension 8. The tank is provided with a top plate section 9 which, adjacent its perimeter, is formed with the curved or bent portion 10. The top 9 is secured to the side walls 6 by any suitable type of fusion joint, as for example by the soldered joint 11. The material which is preferably employed for the tank proper is aluminum or some cheap aluminum alloy. This material, while serving simply as a container for liquid and presenting the advantage of light weight, is not sufficiently strong to subserve the structural functions which are imposed on a tank forming a part of a wing. In order, therefore, to impart to the tank sufficient strength to perform its structural functions, as a wing part, a novel type of construction is provided. As shown especially in Figs. 3 and 4 a template 12 of a stronger metal, and preferably of duralumin, overlies the top plate 9 of the tank as well as the horizontal extensions 8 of the side walls of the tank. This template, as shown in Figs. 3 and 4, extends well beyond the side wall 6 and is so mounted that its outside perimeter coincides with the underlying perimeter of the extension 8. The template 12 is secured to the container proper by means of the rivets 13 which, as shown in Figs. 1, 3 and 4, are positioned within the rectilinear area defined by the spars and ribs so as to provide a unitary gasoline tank in which is involved as securely joined members a light weight high strength metal such as duralumin and a light weight but lower strength metal such as aluminum. It will be seen that by joining the gas tank proper to the template 12 by means of the rivets 13 a unitary structure is provided. This template, therefore, serves as a strengthening element for the gas tank and also as a strong contour forming member. Furthermore, by tightly securing the template to the structural elements of the wing, that is to say the ribs and the spars, it in effect is made to serve as a rigidifying member for the wing, tending to resist torsional, compressive and tension stresses.

In the preferred modification these functions are subserved by providing a plurality of apertures 14 in the perimeter of the composite gasoline tank and template. The apertures 14 extend through both the template and the underlying extension 8 of the gasoline tank proper. Through these apertures suitable means are inserted to secure the template to the spars and ribs. These are shown on the drawing as comprising simple wood screws 15. As actually constructed these wood screws are one inch steel members spaced about two inches apart all the way around the perimeter of the tank.

The composite gasoline tank therefore, as secured to the spars and ribs, forms in effect a part of the wing structure, the stresses imparted to which are borne by the strong template 12. It will be observed that by providing the side wall 6 and the top plate 9 of the gasoline tank with the curved portions 7 and 10, a tight pressure fit may be obtained prior to the soldering or welding operation.

It will be appreciated that the gasoline tank as made up may be in a number of different forms or shapes, all of which are intended to be comprehended within the scope of the invention. In one preferred form shown in the drawing the gasoline tank is provided with the intersecting horizontally disposed baffles 16 and 17 so as to provide a series of surge tanks in open communication with each other. In one form of the invention certain portions of the structure, such for example as the closure member 18 which provides a feed hole for the gasoline tank, may be formed as shown in Fig. 5. In this instance the top of the gasoline tank 9 is curved downwardly near its termination as at 10 and is joined at its termination by suitable fusion joints 19 and 20 to the threaded closure member 20. As shown in Figs. 5 and 6, this closure member is internally threaded as at 21 to receive its cap and is extended beyond its circumference as at 22 to form a relatively wide plate. This plate is secured to the template 12 by any suitable type of rigid securing means, such as the rivets 23.

Preferably the closure member 20 may be made of dural, although if desired any other metal may be employed. It will be seen from this structure that the area adjacent the feed hole is strongly rigidified not only by means of the high strength extension 22 but also by the template 12. The outlet apertures 24, shown in detail in Fig. 6, may be simple cylindrical members internally threaded to receive the feed conduit and soldered or otherwise joined to the side walls 6 and the bottom plate 5 of the tank proper.

The closure members 25 and 26 are constructed similarly to the closure member 18, that is to say they may be provided with internally threaded neck caps formed with laterally extending flanges which overlie and are tightly secured to the template by means of aluminum rivets. If desired, suitable resilient material such as rubber may be interposed between the side plate 6 and the adjacent surfaces of the spars, and/or ribs, so as to dampen out any tendency to relative vibration of the parts.

It will be seen that with this structure the entire gasoline tank is hung upon the leading and trailing spars and wing rib structure, and that furthermore the tank is secured to the structural part of the wing through the intermediacy of a very strong template so that the material of the gasoline tank proper is relieved from any stresses. In this manner the gasoline tank itself may be made up of a light weight metal without any particularly high requirements as to strength, whereas sufficient strength is imparted to the tank considered as a unit by the provision of the strong template. Incidentally it will be understood that by constructing the gasoline tank in the manner described, that is to say by utilizing the template at the upper portion of the wing, not only is a suspended structure secured but the template also serves as a contour member or, if desired, as a wing skin.

The use of light weight metals for gasoline tanks has very decidedly improved airplane construction. For example, in a typical small airplane the substitution of a duralumin gasoline tank for the older relatively heavy gauge copper tank insured a total saving of forty-five pounds. On that particular plane the weight carried was equal to 6½ lbs. per horse power so that this substitution involved a saving of seven horse power which was released for useful work. In the present improvement this advantage of light weight is achieved in the highest order because, if desired, lighter metals than aluminum, such as magnesium, may be employed for the gas tank proper without in any way sacrificing the strength of the structure. This construction also enables the elimination of the use of expensive duralumin in the gas tank proper and so avoids not only the extra expense of this metal but also the difficulty of servicing, and furthermore eliminates the well known difficulty attendant theretofore in the use of duralumin, namely the formation of sediment and the consequent interference with the flow of gasoline.

Since the present improvement contemplates the use of aluminum alloys and alloys of metals lighter than aluminum, such as magnesium, these alloys are referred to herein as alloys of the magal type.

While preferred embodiments of the invention have been given, it is to be understood that these are given as illustrative of the invention and not as descriptive of a specific structure, and hence the invention is not to be restricted short of the limitations clearly imposed by the appended claims.

I claim:

1. An airplane wing comprising structural spar and rib members, a fuel tank comprising a boxlike container of a magal metal of a relatively low tensile strength which is substantially unaffected by the fuel, which container is inclosed within the wing, and a template of magal metal of the dural type secured to the container, said template being so mounted as to define the contour of the wing and to sustain wing stresses.

2. A wing construction comprising leading and trailing spars, relatively widely spaced ribs attached to the spars, a fuel tank comprising a box-like container of a magal metal of the non-dural type which is substantially unaffected by the fuel; the container being nested within the area defined by the attached ribs and spars, and a template of a magal metal of the dural type rigidly secured respectively to the container, spars and ribs.

3. An airplane fuel tank comprising a closed box-like structure of a magal metal of the non-dural type which is substantially unaffected by the fuel, the tank having a laterally extending perimetral flange, a template of magal metal of the dural type overlying the upper surface of the container including the flange, means rigidly to secure the template to the flange, and means to attach the said flange to structural elements of a wing so as to form a structural part of the wing.

4. A wing comprising spar and rib members, a gasoline tank constructed of a magnesium base alloy of the non-dural type, which container is nested within the wing, and a contoured template of duralumin rigidly secured to the upper surface of the container and to structural elements of the wing and forming a stress-taking member of the wing.

5. An airplane wing comprising inter-connected spars and ribs, a fuel tank nested between adjacent spars and ribs, the tank comprising a box-like container constructed of an aluminum base alloy of the non-dural type which is substantially unaffected by the fuel; a contoured template of duralumin rigidly secured to the upper surfaces of the container and to the spars of the wing and forming a stress-taking member of the wing.

GIUSSEPPE M. BELLANCA.